US012565152B2

(12) United States Patent
Fukui et al.

(10) Patent No.: US 12,565,152 B2
(45) Date of Patent: Mar. 3, 2026

(54) CONSOLE BOX

(71) Applicant: TOYODA GOSEI CO., LTD., Kiyosu (JP)

(72) Inventors: Naoyuki Fukui, Kiyosu (JP); Takuto Kamaya, Kiyosu (JP); Yu Hishida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 384 days.

(21) Appl. No.: 18/324,337

(22) Filed: May 26, 2023

(65) Prior Publication Data

US 2024/0001856 A1 Jan. 4, 2024

(30) Foreign Application Priority Data

Jun. 29, 2022 (JP) ................................. 2022-104544

(51) Int. Cl.
| *B60J 7/04* | (2006.01) |
| *B60R 7/04* | (2006.01) |
| *E05B 83/32* | (2014.01) |

(52) U.S. Cl.
CPC ................ *B60R 7/04* (2013.01); *E05B 83/32* (2013.01)

(58) Field of Classification Search
USPC ....................................................... 296/24.34
See application file for complete search history.

(56) References Cited

U.S. PATENT DOCUMENTS

| | | | | |
|---|---|---|---|---|
| 5,357,652 | A * | 10/1994 | Yamada | ..................... B60R 7/04 49/193 |
| 6,003,716 | A * | 12/1999 | Allison | ..................... B60R 7/04 220/326 |
| 9,637,060 | B2 * | 5/2017 | Gaudig | ..................... B60R 7/06 |
| 10,526,830 | B2 * | 1/2020 | Ike | ......................... E05D 15/502 |

FOREIGN PATENT DOCUMENTS

| | | |
|---|---|---|
| JP | S62-10152 U | 1/1987 |
| JP | H02-33755 U | 3/1990 |
| JP | H03276832 A | 12/1991 |
| JP | 2001-097128 A | 4/2001 |
| JP | 2010-173440 * | 8/2010 |

OTHER PUBLICATIONS

Google Patents English language translation of JP-S6210152-U (Year: 1987).*
Office Action mailed on Apr. 1, 2025 issued in corresponding JP Patent Application 2022-104544 (and English translation).

* cited by examiner

*Primary Examiner* — Joseph D. Pape
(74) *Attorney, Agent, or Firm* — Posz Law Group, PLC

(57) ABSTRACT

A console box includes a box main body, a lid, first coupling portions respectively provided at opposite end portions in a width direction of the box main body, a second coupling portion that is provided at at least one end portion of opposite end portions in the width direction of the lid, a lock mechanism, an operation portion, a guide portion provided in the box main body. The guide portion allows for a movement of the lid in which the second coupling portion moves from a position at which the second coupling portion is coupled to the first coupling portion at one end portion in the width direction to a position at which the second coupling portion is coupled to the first coupling portion at the other end portion. The guide portion guides the lid at the second coupling portion during the movement.

3 Claims, 7 Drawing Sheets

CONSOLE BOX

BACKGROUND

1. Field

The present disclosure relates to a console box.

2. Description of Related Art

Japanese Laid-Open Patent Publication No. H03-276832 discloses a console box installed in a passenger compartment. Such a console box includes a box main body having an opening in an upper portion, and a box door (lid) that is attached to a rear end of the upper portion of the box main body with a hinge and configured to open and close the opening. The box door is divided into two front and rear segments. The two front and rear segments are coupled to each other with a rotation shaft.

The front segment is rotatable about the rotation shaft, which serves as the center of rotation, with respect to the rear segment. The front segment can be turned over by being rotated about the rotation shaft, which serves as the center of rotation. A cup holder is provided on the back side of the front segment. Therefore, the cup holder can be used by turning over the front segment.

In the above-described console box, the front segment, which is part of the box door, can be turned over, but the entire box door cannot be turned over. Therefore, there is a demand for a console box in which the entire box door can be turned over.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a console box includes a box main body including an upper opening, a lid that opens and closes the upper opening, first coupling portions respectively provided at opposite end portions in a width direction of the box main body, a second coupling portion that is provided at at least one end portion of opposite end portions in the width direction of the lid and is rotatably and detachably coupled to the corresponding first coupling portion, a lock mechanism that locks the lid at a closing position at which the lid closes the upper opening, an operation portion that is operated so as to cause the lock mechanism to release the lid, and a guide portion that is provided in the box main body and allows for a movement of the lid in which the second coupling portion of the lid moves from a position at which the second coupling portion is coupled to the first coupling portion at one end portion in the width direction to a position at which the second coupling portion is coupled to the first coupling portion at the other end portion. The guide portion guides the lid at the second coupling portion during the movement.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A console box 11 for a vehicle according to one embodiment will now be described with reference to the drawings. In the following description, the direction in which the vehicle advances forward will be referred to as the front, and the reverse direction will be referred to as the rear. The up-down direction refers to the up-down direction of the vehicle, and the vehicle width direction refers to the left-right direction of the vehicle.

<Console Box 11>

Figure 1:
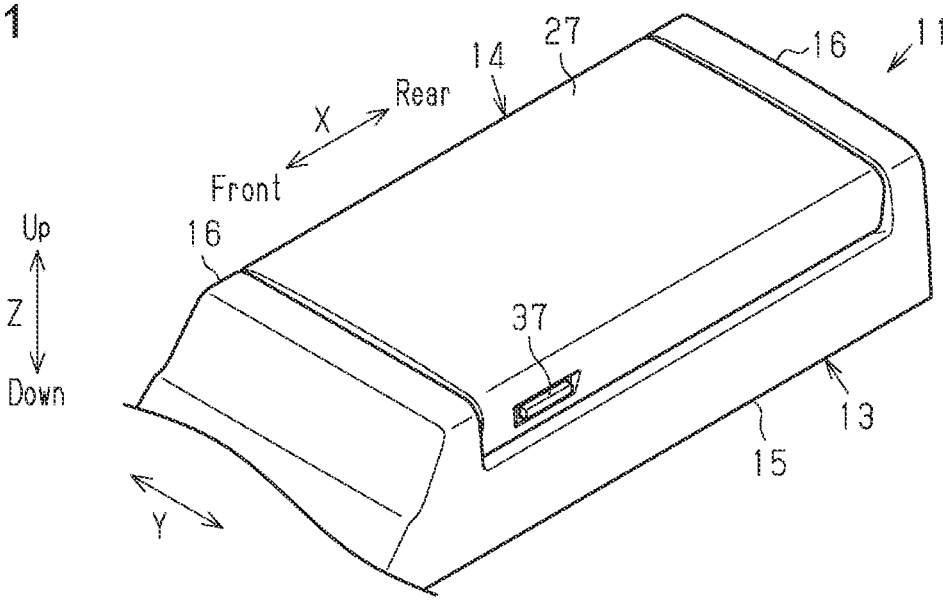
FIG. 1 is a perspective view of a console box according to one embodiment.
Figure 2:
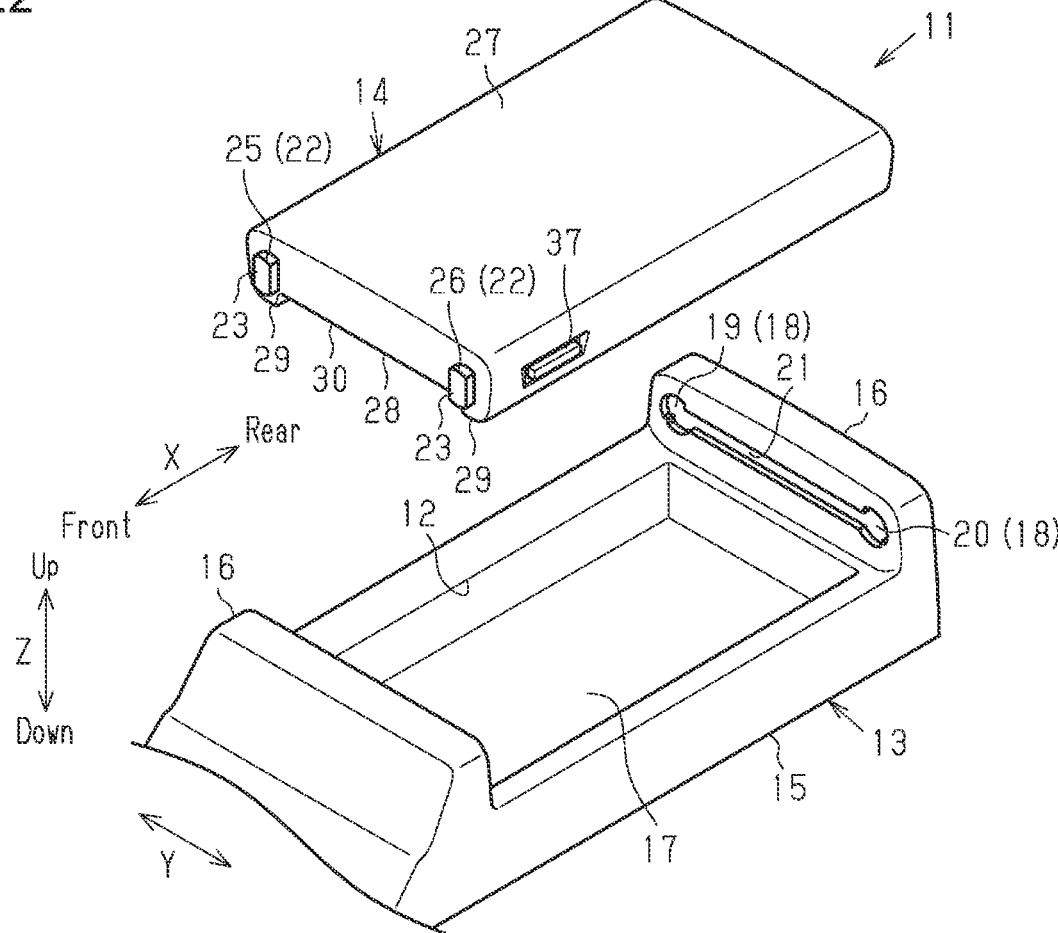
FIG. 2 is an exploded view of the console box shown in FIG. 1.

As shown in FIGS. 1 and 2, the console box 11 is disposed between a driver's seat and a front passenger seat in a passenger compartment. The console box 11 includes a box main body 13, which has a rectangular upper opening 12 extending in a front-rear direction X, and a hollow lid 14, which opens and closes the upper opening 12 and has a shape of a substantially rectangular plate extending in the front-rear direction X.

<Box Main Body 13>

As shown in FIGS. 1 and 2, the box main body 13 includes a base portion 15, which has a shape of a substantially rectangular plate extending in the front-rear direction X, and two wall portions 16, which are provided upright at opposite end portions in the front-rear direction X of the upper surface of the base portion 15. The two wall portions 16 are formed integrally with the base portion 15. The two wall portions 16 extend in a vehicle width direction Y over the entire base portion 15. The two wall portions 16 face each other in the front-rear direction X.

The base portion 15 includes a rectangular accommodating portion 17, which is recessed in a region between the two wall portions 16 on an upper surface. The accommodating portion 17 is capable of accommodating small articles or the like. The accommodating portion 17 includes an opening at the upper end, and the opening forms the upper opening 12, which is described above. Each of the two wall portions 16 includes shaft receiving portions 18, which form first coupling portions, at opposite end portions in the vehicle width direction Y. The shaft receiving portions 18 are formed in inner surfaces in the front-rear direction X of the wall portions 16. That is, two shaft receiving portions 18 are provided at each end portion in the vehicle width direction Y, which is the width direction of the box main body 13.

The shaft receiving portions 18 located at one end in the vehicle width direction Y of the two wall portions 16 are referred to as first shaft receiving portions 19, and the shaft receiving portions 18 located at the other end in the vehicle width direction Y of the two wall portions 16 are referred to as second shaft receiving portions 20. The first shaft receiving portions 19 of the two wall portions 16 face each other in the front-rear direction X. The second shaft receiving portions 20 of the two wall portions 16 face each other in the front-rear direction X.

The first shaft receiving portions 19 and the second shaft receiving portions 20 are each formed by a substantially circular recess. Each wall portion 16 includes a guide groove 21, which is an example of a guide portion extending in the vehicle width direction Y, between the first shaft receiving portion 19 and the second shaft receiving portion 20. The guide groove 21 connects the first shaft receiving portion 19 and the second shaft receiving portion 20 to each other in each wall portion 16.

<Lid 14>

Figure 3:
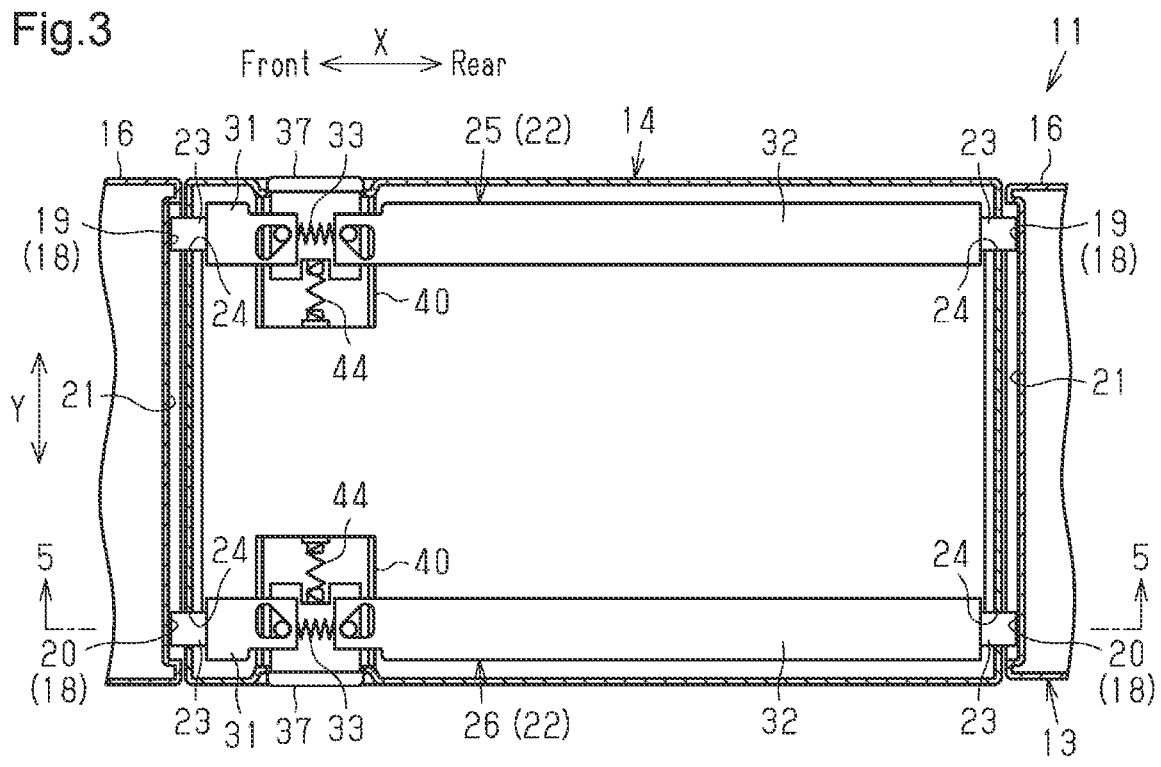
FIG. 3 is a cross-sectional plan view of the console box shown in FIG. 1.

As shown in FIGS. 1 to 3, the lid 14 includes rotation shafts 22 at opposite end portions in the vehicle width direction Y. The rotation shafts 22 form second coupling portions and extend in the front-rear direction X. Each rotation shaft 22 is provided so as to rotate integrally with the lid 14. The rotation shafts 22 extend in the front-rear direction X through opposite end portions in the vehicle width direction Y of the lid 14. Each rotation shaft 22 includes end portions 23 at opposite ends in the front-rear direction X. The end portions 23 retractably protrudes from the opposite ends in the front-rear direction of the lid 14.

The lid 14 includes through-holes 24 at the opposite ends in the front-rear direction X to allow the opposite end portions of the rotation shafts 22 to protrude and retract. A portion of each rotation shaft 22 other than the opposite end portions in the front-rear direction X is always accommodated in the lid 14. The rotation shaft 22 provided at one end portion in the vehicle width direction Y of the lid 14 is referred to as a first rotation shaft 25, and the rotation shaft 22 provided at the other end portion in the vehicle width direction Y of the lid 14 is referred to as a second rotation shaft 26.

The lid 14 includes a first surface 27 and a second surface 28, which is located on the side opposite to the first surface 27. The first surface 27 has, for example, the same pattern as the upper surfaces of the wall portions 16 of the box main body 13. Protrusions 29 extending in the front-rear direction X are provided at the opposite end portions in the vehicle width direction Y of the second surface 28. The second surface 28 includes a flat placement surface 30 between the protrusions 29. A cup or the like can be placed on the placement surface 30. Accordingly, the first surface 27 and the second surface 28 of the lid 14 have different appearances from each other.

When the lid 14 is at a closing position (position shown in FIG. 1), at which the lid 14 closes the upper opening 12 of the box main body 13 with the first surface 27 facing upward, the first surface 27 is substantially flush with the upper surfaces of the wall portions 16 of the box main body 13. At this time, opposite side surfaces in the vehicle width direction Y of the lid 14 are positioned slightly inward of the opposite side surfaces in the vehicle width direction Y of the base portion 15 of the box main body 13.

<Coupling Structure of Lid 14 and Box Main Body 13>

As shown in FIGS. 1 to 3, when the lid 14 is in the closing position, the end portions 23 of the first rotation shaft 25 are inserted into the first shaft receiving portions 19 of the two wall portions 16, respectively. Accordingly, the end portions 23 of the first rotation shaft 25 are rotatably and detachably coupled to and supported by the first shaft receiving portions 19 of the wall portions 16. When the lid 14 is in the closing position, the end portions 23 of the second rotation shaft 26 are inserted into the second shaft receiving portions 20 of the two wall portions 16, respectively. Accordingly, the end portions 23 of the second rotation shaft 26 are rotatably and detachably coupled to and supported by the second shaft receiving portions 20 of the wall portions 16.

Figure 4:
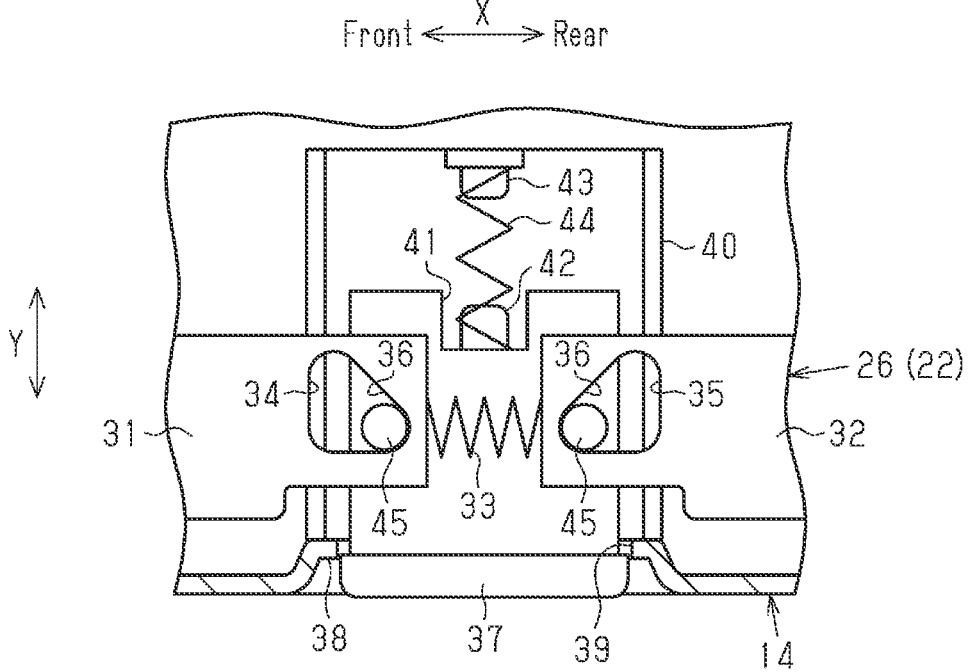
FIG. 4 is a partially enlarged view of FIG. 3.
Figure 5:
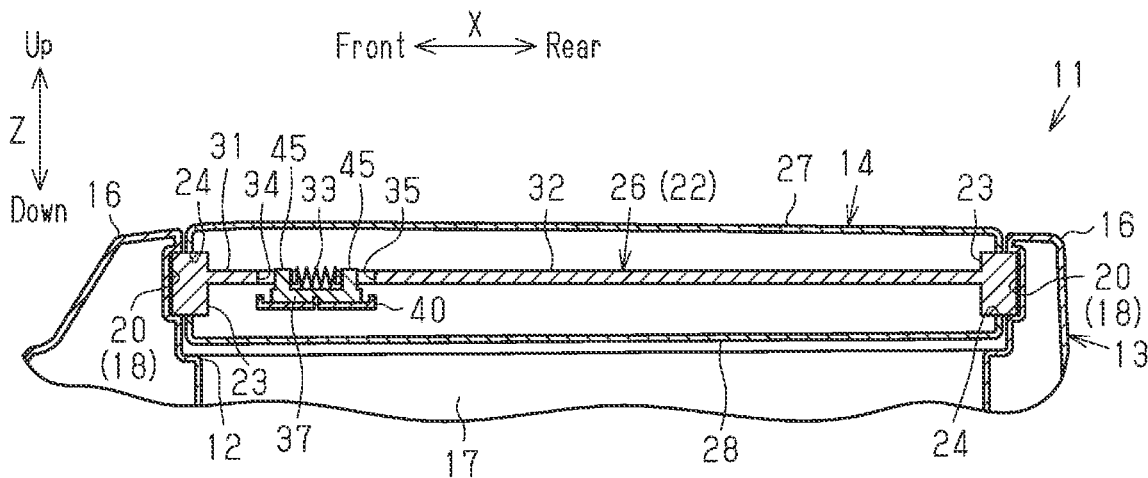
FIG. 5 is a cross-sectional view taken along line 5-5 of FIG. 3.

As shown in FIGS. 3 to 5, each rotation shaft 22 includes a front shaft 31, which extends in the front-rear direction X, a rear shaft 32, which is disposed on the rear side of the front shaft 31 and extends in the front-rear direction X, and a first spring 33, which couples the front shaft 31 and the rear shaft 32 to each other. That is, the rotation shaft 22 has a configuration in which the rear end of the front shaft 31 and the front end of the rear shaft 32 are coupled to each other by the first spring 33. The length of the front shaft 31 is shorter than the length of the rear shaft 32. The first spring 33 includes, for example, a compression coil spring.

A rear end portion of the front shaft 31 and a front end portion of the rear shaft 32 include a front through-hole 34 and a rear through-hole 35, respectively. The front through-hole 34 and the rear through-hole 35 extend in the up-down direction Z through the front shaft 31 and the rear shaft 32, respectively. The front through-hole 34 and the rear through-hole 35 substantially have shapes of rounded right-angled triangles that are symmetrical with respect to a plane orthogonal to the axis of the rotation shaft 22 and bisecting the first spring 33.

The front through-hole 34 and the rear through-hole 35 are disposed such that hypotenuse portions 36 are positioned on the inner side in the vehicle width direction Y. The hypotenuse portion 36 of each of the front through-hole 34 and the rear through-hole 35 extends inward in the vehicle width direction Y as the hypotenuse portion 36 extends away from the first spring 33 in the front-rear direction X. As an example, the hypotenuse portion 36 of each of the front through-hole 34 and the rear through-hole 35 extends so as to form an angle of about 45° with respect to the vehicle width direction Y.

<Lock Mechanism>

As shown in FIGS. 1 to 3, when the lid 14 is located at the closing position, the front shaft 31 and the rear shaft 32 of the rotation shaft 22 are urged away from each other in the front-rear direction X by the first spring 33, so that the end portions 23 of the rotation shaft 22 are inserted into the shaft receiving portions 18 of the wall portions 16. That is, the urging force of the first spring 33 maintains the state in which the end portions 23 of the rotation shaft 22 are inserted into the shaft receiving portions 18 of the wall portions 16, so that the lid 14 is locked at the closing position.

Therefore, in the present embodiment, the rotation shaft 22 and the shaft receiving portions 18 form a lock mechanism. In a state in which the lid 14 is locked at the closing position, the engagement between the rotation shaft 22 and the shaft receiving portions 18 restricts movement of the lid 14 in all directions.

<Coupling Structure Between Operation Portion 37 and Lock Mechanism>

As shown in FIGS. 3 to 5, the lid 14 includes substantially rectangular recesses 38 on the opposite side surfaces in the vehicle width direction Y. Each recess 38 extends in the front-rear direction X at a position corresponding to the coupling portion between the front shaft 31 and the rear shaft 32 of the corresponding rotation shaft 22. Each recess 38 includes a substantially rectangular insertion hole 39 extending in the front-rear direction X in the bottom wall. An operation portion 37 having a shape of a substantially rectangular plate is inserted into each insertion hole 39 so as to be movable in the vehicle width direction Y. That is, the operation portions 37 are provided in the lid 14.

The operation portion 37 overlaps with the first spring 33, the front through-hole 34, and the rear through-hole 35 in the up-down direction Z. The operation portion 37 is located closer to the second surface 28 than the first spring 33, the front through-hole 34, and the rear through-hole 35 in the up-down direction Z. The lid 14 incorporates rectangular plate-shaped support plates 40, which are located between the operation portions 37 and the second surface 28 to support the operation portions 37. The support plates 40 extend inward in the vehicle width direction Y in the lid 14 from the opposite side surfaces in the vehicle width direction Y in the lid 14.

In the vehicle width direction Y, the inner end of each support plate 40 is located inward of the inner end of the corresponding operation portion 37. In the vehicle width direction Y, the length of the support plate 40 is longer than the length of the operation portion 37. Each operation portion 37 includes a cutout recess 41 in a central portion in the front-rear direction X of the inner end portion in the vehicle width direction Y. The cutout recess 41 includes a first spring coupling portion 42 on the bottom.

Each support plate 40 includes a second spring coupling portion 43 at a central portion in the front-rear direction X of the inner end portion in the vehicle width direction Y. Each second spring coupling portion 43 faces the corresponding first spring coupling portion 42 in the vehicle width direction Y. One end portion of a second spring 44 is coupled to the first spring coupling portion 42, and the other end portion of the second spring 44 is coupled to the second spring coupling portion 43. The second spring 44 is, for example, a compression coil spring.

The outer end surfaces in the vehicle width direction Y of the operation portions 37 are substantially flush with the side surfaces of the lid 14 in the vehicle width direction Y. The outer end portions in the vehicle width direction Y of the operation portions 37 are exposed from the lid 14. A portion of each operation portion 37 that is exposed from the lid 14 is substantially accommodated in the recess 38.

Each operation portion 37 includes a pair of columnar pins 45 on the surface corresponding to the first surface 27. The pins 45 are located at positions that face the front through-hole 34 and the rear through-hole 35, respectively. The two pins 45 are inserted into the front through-hole 34 and the rear through-hole 35, respectively. The two pins 45 are in contact with end portions of the hypotenuse portions 36 of the front through-hole 34 and the rear through-hole 35 on the side closer to the first spring 33.

<Operation of Operation Unit 37>

In the state shown in FIGS. 3 and 4, for example, if the operation portion 37 at the second rotation shaft 26 is pressed into the lid 14 in the vehicle width direction Y against the urging force of the second spring 44, the following actions take place. That is, the second spring 44 is compressed and elastically deformed, and the two pins 45 slide along the respective hypotenuse portions 36 of the front through-hole 34 and the rear through-hole 35.

Figure 6:
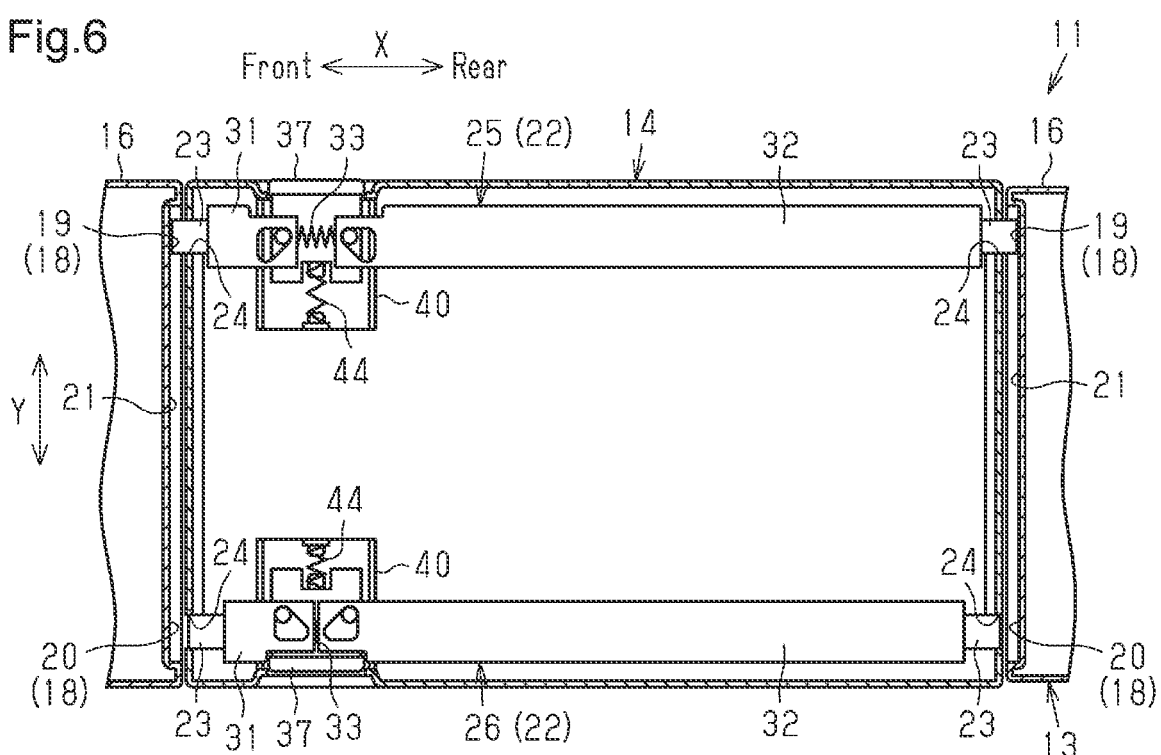
FIG. 6 is a cross-sectional view showing a state in which an operation portion on the side corresponding to a second rotation shaft is pressed in FIG. 3.
Figure 7:
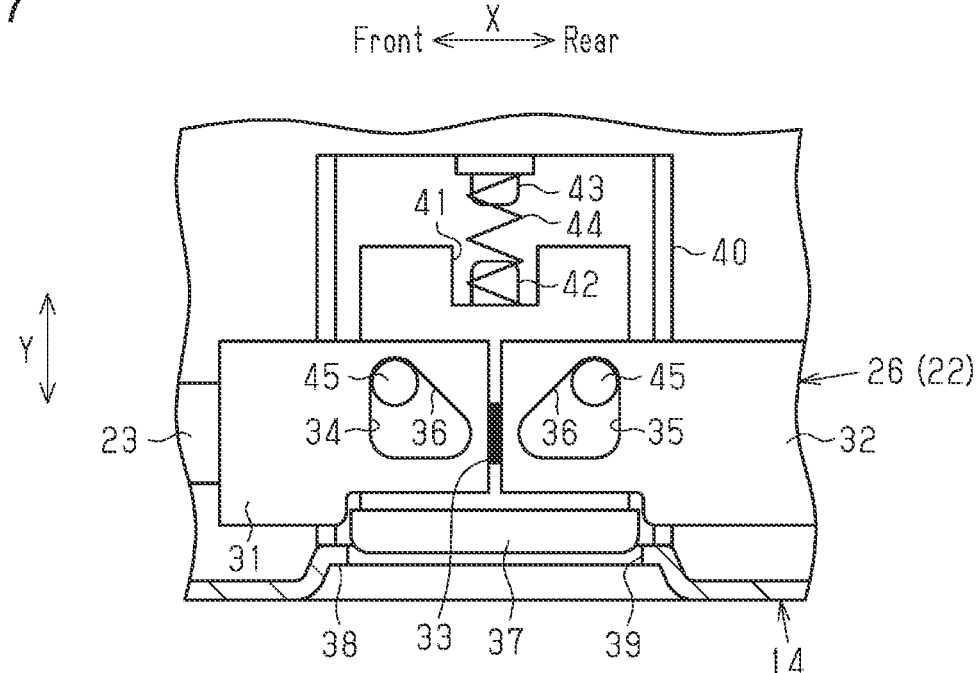
FIG. 7 is a partially enlarged view of FIG. 6.

The sliding action moves the front shaft 31 and the rear shaft 32 of the second rotation shaft 26 closer to each other in the front-rear direction X, and the first spring 33 is compressed and elastically deformed, as shown in FIGS. 6 and 7. Then, the opposite end portions 23 of the second rotation shaft 26 are retracted from the second shaft receiving portions 20 of the wall portions 16 and are accommodated in the lid 14. This disengages the end portions 23 of the second rotation shaft 26 from the second shaft receiving portions 20 of the wall portions 16.

Accordingly, the second rotation shaft 26 is disengaged from the second shaft receiving portions 20 to release the lid 14, the lid 14 can be rotated about the first rotation shaft 25, which serves as the center of rotation, to open the upper opening 12. When the operation portion 37 stops being pressed inward, the elastic restoring forces of the first spring 33 and the second spring 44 cause the front shaft 31 and the rear shaft 32 of the second rotation shaft 26 and the operation portion 37 to return to their original positions before the pressing action of the operation portion 37.

When the operation portion 37 located at the first rotation shaft 25 is operated in the same manner as the operation of the operation portion 37 located at the second rotation shaft 26 described above, the following actions take place. That is, since the first rotation shaft 25 is disengaged from the first shaft receiving portions 19 to release the lid 14, the lid 14 can be rotated about the second rotation shaft 26, which serves as the center of rotation, to open the upper opening 12.

When the operation portion 37 located at the first rotation shaft 25 and the operation portion 37 located at the second rotation shaft 26 are pressed inward simultaneously, the lid 14 can be completely removed from the box main body 13.

Therefore, when the operation portions 37 are pressed inward, the lid 14 stops being locked at the closing position by the lock mechanism.

<Configuration Detail of Lid 14 and Structure Around Lid 14>

Figure 8:
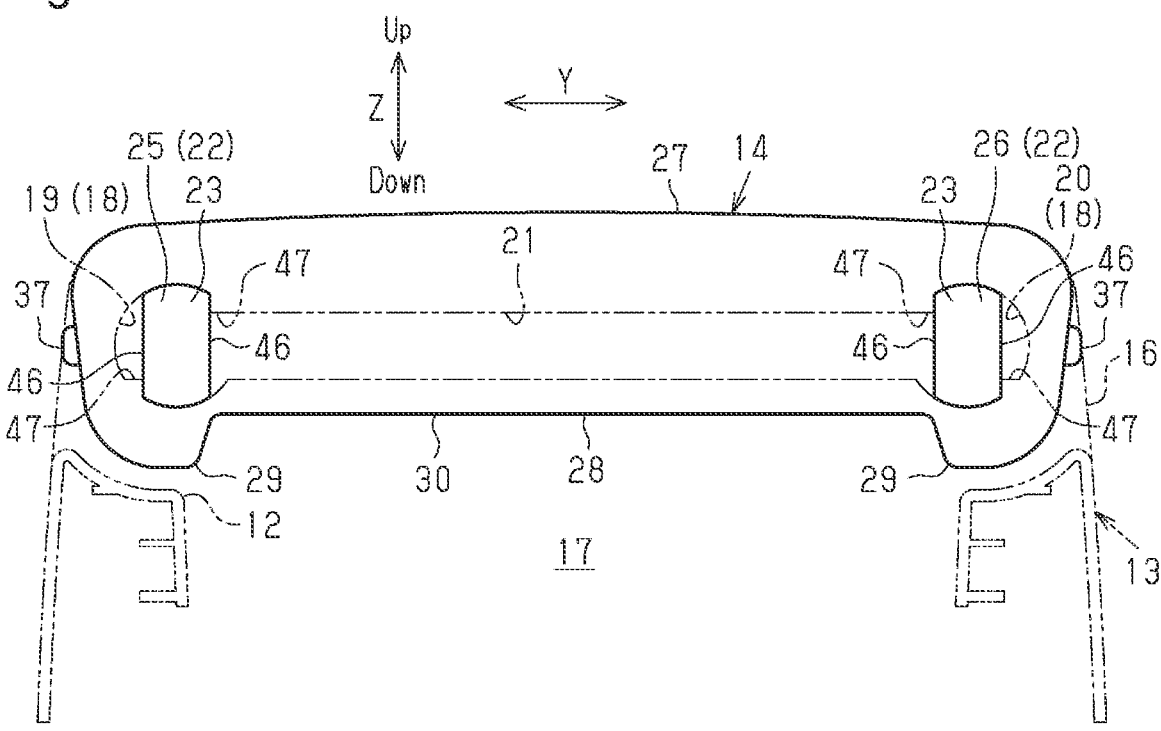
FIG. 8 is a schematic diagram illustrating a positional relationship between an end portion of a rotation shaft and a shaft receiving portion when a lid is at a closing position with a first surface facing upward.
Figure 9:
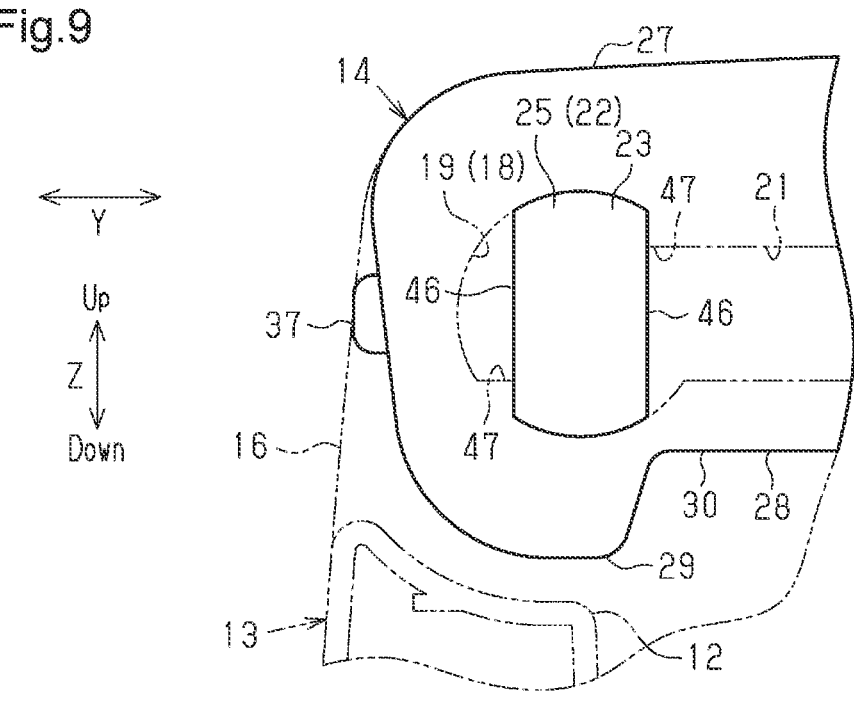
FIG. 9 is a partially enlarged view of FIG. 8.

As shown in FIGS. 2, 8, and 9, the end portions 23 of the rotation shaft 22 each have a substantially rectangular parallelepiped shape. That is, the end portions 23 of the rotation shaft 22 each have a substantially rectangular shape when viewed from the front-rear direction X. The opposite surfaces in the direction of the long sides of each end portion 23 of the rotation shaft 22 are arcuately curved surfaces bulging outward. The opposite surfaces in the direction of the short sides of each end portion 23 of the rotation shaft 22 are first restricting surfaces 46, which are flat surfaces. That is, the end portions 23 of the rotation shaft 22 include the first restricting surfaces 46. The dimension of the long sides of each end portion 23 of the rotation shaft 22 is longer than the width of the guide groove 21. The dimension of the short sides of each end portion 23 of the rotation shaft 22 is slightly shorter than the width of the guide groove 21.

Figure 10:
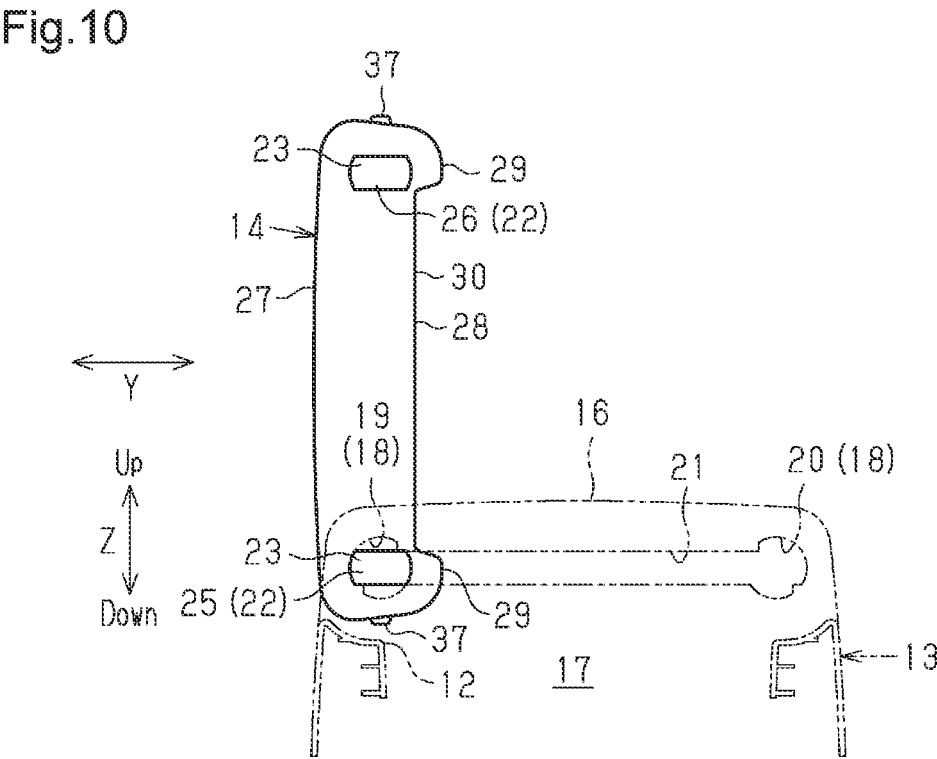
FIG. 10 is a schematic diagram illustrating a state in which the lid is rotated about the first rotation shaft to an opening position.

As shown in FIGS. 8 and 10, the lid 14 rotates about one of the rotation shafts 22 (the first rotation shaft 25 in FIG. 10), which serves as the center of rotation, between a closing position (the position shown in FIG. 8) and an opening position (the position shown in FIG. 10) for opening the upper opening 12. The opening position of the lid 14 in the present embodiment is, for example, a position at which the lid 14 is rotated from the closing position by 90° about one of the rotation shafts 22, which serves as the center of rotation, to open the upper opening 12.

When the lid 14 is at the closing position, the long-side direction of the end portions 23 of the rotation shaft 22 agrees with the up-down direction Z. When the lid 14 is at the opening position, the long-side direction of the end portions 23 of the rotation shaft 22 agrees with the vehicle width direction Y. The guide groove 21 extends linearly in the vehicle width direction Y. Therefore, the end portions 23 of the rotation shaft 22 can enter the guide groove 21 only when the long-side direction of the end portions 23 agrees with the vehicle width direction Y.

That is, the end portions 23 of the rotation shaft 22 can enter the guide grooves 21 only when the end portions 23 are in a position in which the short-side direction thereof agrees with the width direction of the guide grooves 21. Therefore, the guide grooves 21 and the rotation shaft 22 are configured such that the rotation shaft 22 can enter the guide groove 21 only when the lid 14 is located at the opening position.

Figure 11:
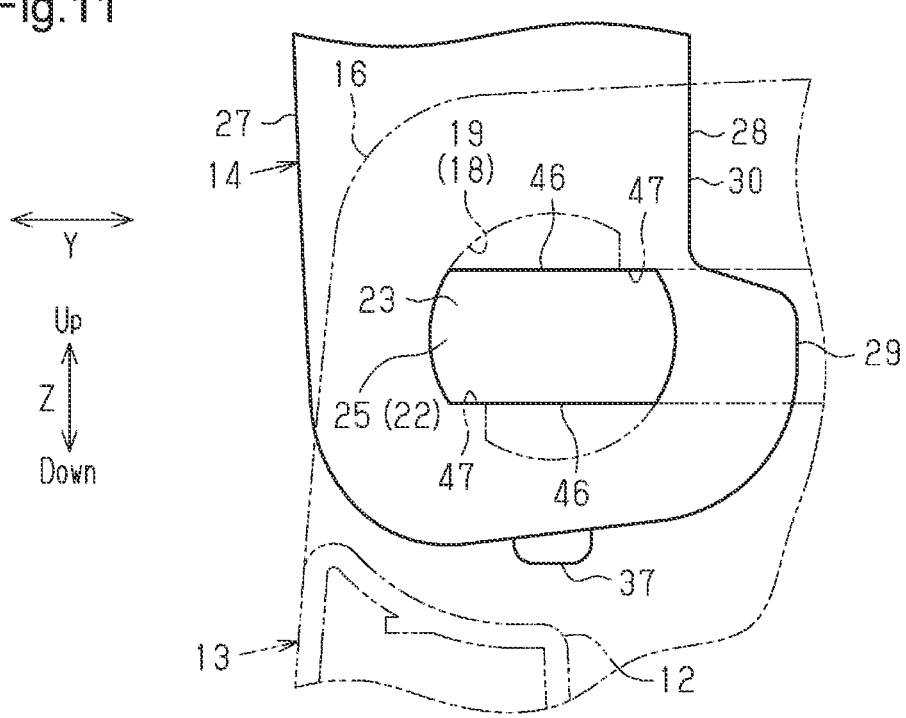
FIG. 11 is a partially enlarged view of FIG. 10.

As shown in FIGS. 9 and 11, each shaft receiving portion 18 includes second restricting surfaces 47. When the lid 14 reaches the opening position, parts of the first restricting surfaces 46 of each end portion 23 of the rotation shaft 22 come into contact with the second restricting surfaces 47, so that rotation of the rotation shaft 22 is restricted. That is, parts of the first restricting surfaces 46 and the second restricting surfaces 47 come into contact with each other to restrict the lid 14 from rotating beyond the opening position about the rotation shaft 22, which serves as the center of rotation.

<Operation of Console Box 11>

Next, operation of the console box 11 when turning over the lid 14 will be described.

As shown in FIGS. 8 and 9, the lid 14 is normally disposed at the closing position with the first surface 27 facing upward. In order to turn over the lid 14 from this state and dispose the lid 14 at the closing position with the second surface 28 facing upward, the operation portion 37 at the second rotation shaft 26 in the lid 14 is pressed inward. This disengages the end portions 23 of the second rotation shaft 26 from the second shaft receiving portions 20 of the wall portions 16. As a result, the lid 14 is no longer locked by the second rotation shaft 26 and the second shaft receiving portions 20.

In this state, when the lid 14 is rotated about the first rotation shaft 25, which serves as the center of rotation, to rotate the lid 14 from the closing position to the opening position as shown in FIGS. 10 and 11, the upper opening 12 is opened. At this time, parts of the first restricting surfaces 46 of each end portion 23 of the first rotation shaft 25 come into contact with the second restricting surfaces 47 of the first shaft receiving portion 19. As a result, the lid 14 is stopped at the opening position. Further, at this time, the first rotation shaft 25 is in a position in which the first rotation shaft 25 can enter the guide groove 21.

Figure 12:
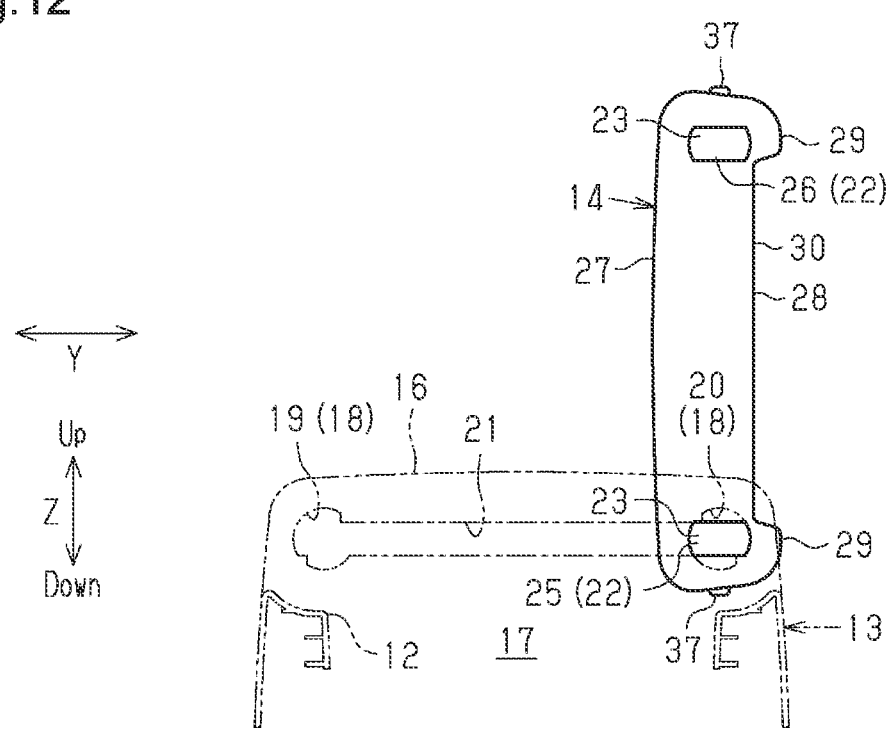
FIG. 12 is a schematic diagram illustrating a state in which the lid is translated from the state shown in FIG. 10 to a position at which the first rotation shaft is supported by a second shaft receiving portion.

Subsequently, as shown in FIG. 12, the lid 14 is moved toward the second shaft receiving portions 20 in the vehicle width direction Y while sliding the end portions 23 of the first rotation shaft 25 in the guide grooves 21. That is, the lid 14 is translated in the vehicle width direction Y so that the first rotation shaft 25 moves from the first shaft receiving portions 19 to the second shaft receiving portions 20 through the guide grooves 21. Accordingly, the first rotation shaft 25 is rotatably supported by the second shaft receiving portions 20.

Figure 13:
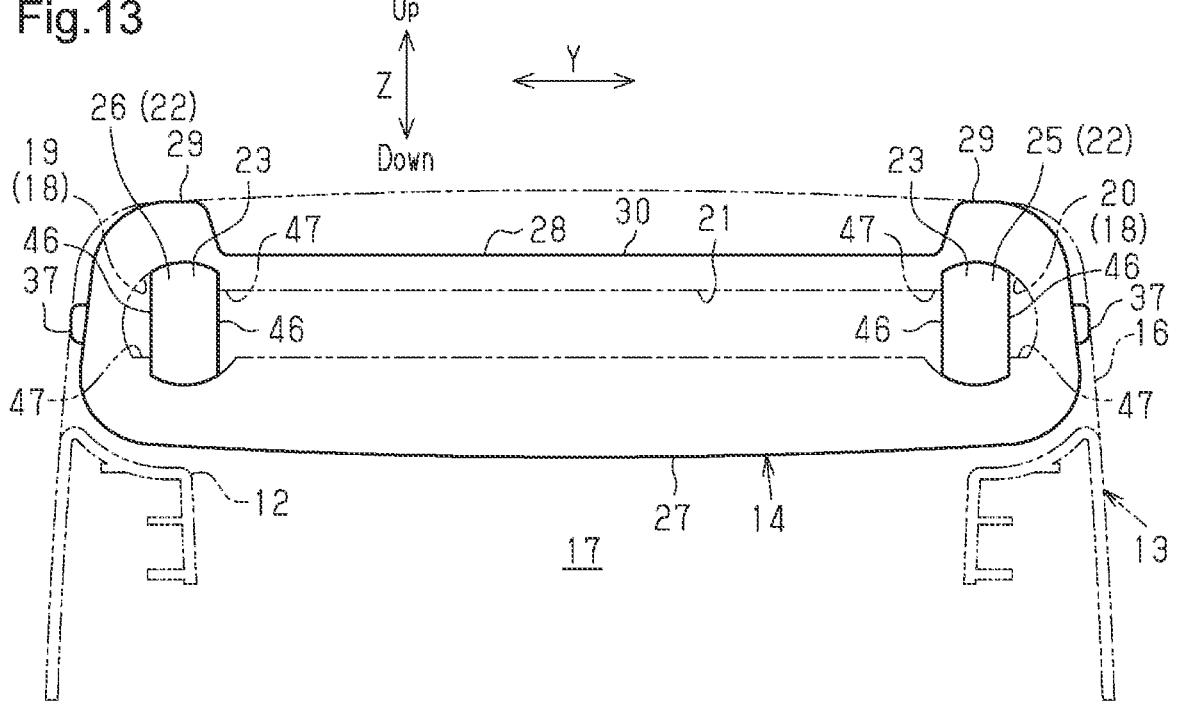
FIG. 13 is a schematic diagram showing a state in which the lid is arranged at a closing position with a second surface facing upward, after being rotated from the state shown in FIG. 12 about the first rotation shaft, which serves as the center of rotation.

At this time, the guide grooves 21 permit the lid 14 to be moved such that the first rotation shaft 25 of the lid 14 moves from a position at which the first rotation shaft 25 is supported by the first shaft receiving portions 19 to a position at which the first rotation shaft 25 is supported by the second shaft receiving portions 20. The guide grooves 21 also guide the lid 14 at the first rotation shaft 25 while the lid 14 moves. Subsequently, as shown in FIG. 13, the lid 14 is rotated about the first rotation shaft 25, which is rotatably supported by the second shaft receiving portions 20 and serves as the center of rotation, thereby closing the upper opening 12 with the lid 14.

The lid 14 is disposed at the closing position with the second surface 28 facing upward. At this time, since the second rotation shaft 26 is engaged with the first shaft receiving portions 19, the lid 14 is locked at the closing position with the second surface 28 facing upward.

As described above, when the lid 14 is turned over, the following actions take place. The direction in which the lid 14 is rotated from the closing position to the opening position about the first rotation shaft 25 supported by the first shaft receiving portions 19, which serves as the center of rotation, is the same as the direction in which the lid 14 is rotated from the opening position to the closing position about the first rotation shaft 25 supported by the second shaft receiving portions 20.

The entire lid 14 is thus easily turned over without removing the lid 14 from the box main body 13. This prevents the lid 14 from being dropped and damaged or from being lost.

Even when the lid 14 is first rotated about the second rotation shaft 26, which serves as the center of rotation, from the closing position to the opening position, the entire lid 14 can be easily turned over without removing the lid 14 from the box main body 13 by performing the same operation as described above.

Advantages of Embodiment

The above-described embodiment achieves the following advantages.

(1) The console box 11 includes the box main body 13, which includes the upper opening 12, the lid 14, which opens and closes the upper opening 12, the shaft receiving portions 18, which are respectively provided at the opposite end portions in the vehicle width direction Y of the box main body 13, the rotation shafts 22, which are provided at the opposite end portions in the vehicle width direction Y of the lid 14 and are rotatably and detachably coupled to the shaft receiving portions 18, the lock mechanism, which locks the lid 14 at the closing position at which the lid 14 closes the upper opening 12, the operation portions 37, which are operated so as to cause the lock mechanism to release the lid 14, and the guide grooves 21, which are provided in the box main body 13 and permit the lid 14 to be moved such that the rotation shaft 22 of the lid 14 moves from a position at which the rotation shaft 22 is supported by the shaft receiving portions 18 at one end portion in the vehicle width direction Y to a position at which the rotation shaft 22 is supported by the shaft receiving portions 18 at the other end portion. The guide grooves 21 also guide the lid 14 at the rotation shaft 22 while the lid 14 moves.

With the above-described configuration, the operation portions 37 are operated such that the lid 14 is no longer locked by the lock mechanism, and the lid 14 is rotated in the opening direction about the rotation shaft 22, which serves as the center of rotation. While the lid 14 is guided by the guide grooves 21 at the rotation shaft 22, the lid 14 is moved such that the rotation shaft 22 of the lid 14 moves from a position at which the rotation shaft 22 is supported by the shaft receiving portions 18 at one end portion in the vehicle width direction Y to a position at which the rotation shaft 22 is supported by the shaft receiving portions 18 at the other end portion. Thereafter, by rotating the lid 14 in the closing direction about the rotation shaft 22, which serves as the center of rotation, the entire lid 14 can be easily turned over.

(2) In the console box 11, the lid 14 includes the first surface 27 and the second surface 28, which is located on the side opposite to the first surface 27. The first surface 27 and the second surface 28 have different appearances.

With the above-described configuration, the function and design of the lid 14 can be changed by switching the position of the lid 14 between the position in which the first surface 27 faces upward and the posture in which the second surface 28 faces upward.

(3) In the console box 11, the lid 14 is configured to rotate about the rotation shaft 22, which serves as the center of rotation, between the closing position and the opening position, at which the lid 14 opens the upper opening 12. The guide grooves 21 and the rotation shaft 22 are configured such that the rotation shaft 22 can enter the guide groove 21 only when the lid 14 is located at the opening position.

The above-described configuration prevents the rotation shaft 22 from entering the guide grooves 21 before the lid 14 reaches the opening position.

(4) In the console box 11, the rotation shaft 22 includes the first restricting surfaces 46. Each shaft receiving portion 18 includes the second restricting surfaces 47. When the lid 14 reaches the opening position, the first restricting surfaces 46 come into contact with the second restricting surfaces 47, so that rotation of the rotation shaft 22 is restricted.

With the above-described configuration, when the lid 14 reaches the opening position, the first restricting surfaces 46 come into contact with the second restricting surfaces 47. This prevents the lid 14 from rotating beyond the opening position.

(5) In the console box 11, the operation portions 37 are provided in the lid 14 and are configured to be pressed into the lid 14.

With the above-described configuration, simply pressing the operation portion 37 inward causes the lock mechanism to release the lid 14.

Modifications

The above-described embodiment may be modified as follows. The above-described embodiment and the following modifications can be combined as long as the combined modifications remain technically consistent with each other.

The opening position of the lid 14 may be a position at which the lid 14 is rotated from the closing position by an angle greater than 90° about one of the rotation shafts 22, which serves as the center of rotation, to open the upper opening 12. In this case, when the lid 14 is in the opening position, it is necessary to adjust the arrangement angle of the end portions 23 such that the end portions 23 of the rotation shaft 22 can enter the guide grooves 21 as the lid 14 is translated in the vehicle width direction Y.

The operation portions 37 may include, for example, operation levers that are operated by being moved or rotated.

The first restricting surfaces 46 and the second restricting surfaces 47 may be omitted.

The guide grooves 21 and the rotation shaft 22 do not necessarily need to be configured such that the rotation shaft 22 can enter the guide groove 21 only when the lid 14 is located at the opening position. That is, the guide grooves 21 and the rotation shaft 22 may be configured such that the rotation shaft 22 can enter the guide groove 21 when the lid 14 is located at a position other than the opening position.

The lid 14 may be configured such that the appearances of the first surface 27 and the second surface 28 are the same.

The lid 14 may be configured such that the first surface 27 and the second surface 28 have the same shape and different colors.

The box main body 13 may include a rotation shaft as the first coupling portion, and the lid 14 may include a shaft receiving portion as the second coupling portion, which is rotatably and detachably coupled to the rotation shaft. In this case, instead of the guide groove 21, a protrusion extending in the vehicle width direction Y may be provided on the box main body 13 as the guide portion, and an engagement portion slidably engaging with the protrusion may be provided on the shaft receiving portion.

One of the first rotation shaft 25 and the second rotation shaft 26 may be omitted. That is, the lid 14 may be of a single-swing type instead of the dual-swing type as in the above-described embodiment. In this case, it is necessary to provide a lock mechanism for locking the lid 14 at the closing position on the side corresponding to the omitted one side of the first rotation shaft 25 and the second rotation shaft 26.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A console box, comprising:

a box main body including an upper opening;

a lid that opens and closes the upper opening;

first coupling portions respectively provided at opposite end portions in a width direction of the box main body;

a second coupling portion that is provided at at least one end portion of opposite end portions in the width direction of the lid and is rotatably and detachably coupled to the corresponding first coupling portion;

a lock mechanism that locks the lid at a closing position at which the lid closes the upper opening;

an operation portion that is operated so as to cause the lock mechanism to release the lid; and a guide portion that is provided in the box main body and allows for a movement of the lid in which the second coupling portion of the lid moves from a position at which the second coupling portion is coupled to the first coupling portion at one end portion in the width direction to a position at which the second coupling portion is coupled to the first coupling portion at the other end portion, the guide portion guiding the lid at the second coupling portion during the movement, wherein, each first coupling portion includes a shaft receiving portion, the second coupling portion includes a rotation shaft that is rotatably supported by the shaft receiving portion and rotates integrally with the lid, the guide portion includes a guide groove in which the rotation shaft slides, the guide portion connecting the shaft receiving portions provided at opposite end portions in the width direction of the box main body, the lid is configured to rotate about the rotation shaft, which serves as a center of rotation, between the closing position and an opening position at which the lid opens the upper opening, the guide groove and the rotation shaft are configured such that the rotation shaft is allowed to enter the guide groove only when the lid is located at the opening position, the rotation shaft includes a first restricting surface, and each shaft receiving portion includes a second restricting surface that restricts rotation of the rotation shaft by coming into contact with the first restricting surface when the lid reaches the opening position.

2. The console box according to claim 1, wherein the lid includes a first surface and a second surface, the second surface being located on a side opposite to the first surface, and the first surface and the second surface have different appearances.

3. The console box according to claim 1, wherein the operation portion is provided in the lid and is configured to be pressed into the lid.

* * * * *